United States Patent [19]

Birken et al.

[11] Patent Number: 5,784,682
[45] Date of Patent: Jul. 21, 1998

[54] SYSTEM FOR SEPARATING CONSTITUENTS FROM A BASE MATERIAL

[76] Inventors: Stephen M. Birken, 23 Mohawk Trail; Karl Birken, 38 Grant Hill Ct., both of Clifton Park, N.Y. 12065

[21] Appl. No.: 602,195

[22] Filed: Feb. 16, 1996

[51] Int. Cl.$^6$ ................................................ B01J 19/12
[52] U.S. Cl. ........................ 422/186; 422/900; 422/906
[58] Field of Search ................................ 422/186, 900, 422/906

[56] References Cited

U.S. PATENT DOCUMENTS

| | | | |
|---|---|---|---|
| 2,553,944 | 5/1951 | Schlesman | 204/171 |
| 3,205,162 | 9/1965 | MacLean | 204/312 |
| 3,261,959 | 7/1966 | Connell et al. | 219/10.55 |
| 3,948,601 | 4/1976 | Fraser et al. | 21/54 R |
| 3,981,687 | 9/1976 | Vig | 29/25.35 |
| 4,030,051 | 6/1977 | Shimizu et al. | 333/83 R |
| 4,056,368 | 11/1977 | Rozmus | 55/2 |
| 4,207,286 | 6/1980 | Boucher | 422/21 |
| 4,321,089 | 3/1982 | Kruesi et al. | 75/84.5 |
| 4,371,854 | 2/1983 | Cohn et al. | 333/252 |
| 4,388,601 | 6/1983 | Sneed, Jr. et al. | 333/227 |
| 4,455,135 | 6/1984 | Bitterly | 432/1 |
| 4,523,127 | 6/1985 | Moeller | 315/4 |
| 4,572,735 | 2/1986 | Poetzschke et al. | 75/10 R |
| 4,633,180 | 12/1986 | Biehl et al. | 324/316 |
| 4,818,510 | 4/1989 | Jung | 423/335 |
| 4,883,570 | 11/1989 | Efthimion et al. | 204/164 |
| 4,894,134 | 1/1990 | Birken et al. | 204/193 |
| 4,918,049 | 4/1990 | Cohn et al. | 505/1 |
| 5,002,784 | 3/1991 | Paré et al. | 426/241 |
| 5,024,740 | 6/1991 | Birken et al. | 204/157.15 |
| 5,146,058 | 9/1992 | Herfindahl et al. | 219/10.55 A |
| 5,199,488 | 4/1993 | Kasevich et al. | 166/248 |
| 5,338,557 | 8/1994 | Paré | 426/241 |
| 5,377,426 | 1/1995 | Paré | 34/259 |
| 5,400,004 | 3/1995 | Moeller | 333/252 |
| 5,450,047 | 9/1995 | Jory | 333/252 |
| 5,458,897 | 10/1995 | Paré | 426/241 |
| 5,471,182 | 11/1995 | Rivera et al. | 333/252 |
| 5,487,873 | 1/1996 | Bridges et al. | 588/212 |

FOREIGN PATENT DOCUMENTS

| | | |
|---|---|---|
| 61-199078 | 9/1986 | Japan . |
| 739245 | 6/1980 | U.S.S.R. . |

OTHER PUBLICATIONS

"Fluorinert Electronic Liquids", pp. 1–6, Jan. 1981.
"A Vacuum Window For a 1MW CW 110 GHz Gyrotron"; General Atomics Report GA–A21741; Authors: Moeller and DiMartino, Jul. 1994, pp. 1–2.
"Selective Magnetic Enhancement of Pyrite in Coal by Dielectric Heating"; Jan. 1, 1973–Mar. 31, 1979; Delwyn Bluhm, pp. 1–11.
"Examination of the Frequency–Dependent Conductivity of Ore–Containing Rock on Artificial Models"; Jul. 15, 1971; Grissemann pp. 1–13.
"Coal Desulfurization by a Microwave Process"; Jan. 1982; Zavitsamos and Bleiler, pp. 1–24.
"Coal Desulfurization Using Microwave Energy"; Jun. 1978; General Electric Company, Zavitsanos, P.D. et al, pp. 1–66.
"New Ways to Process Oil Shale"; Chemical Engineering; Feb. 22, 1982, vol. 89, No. 4, pp. 37–43.
"The Relative Transparency of Minerals to Microwave Radiation"; Canadian Metallurgical Quarterly; vol. 23, No. 3/Jul.–Sep. 1984, pp. 349–351.

*Primary Examiner*—Kathryn L. Gorgos
*Assistant Examiner*—Chrisman D. Carroll
*Attorney, Agent, or Firm*—Rader Fishman & Grauer PLLC

[57] ABSTRACT

A system for separating constituents from a base material using RF energy which is coupled to a reaction chamber by way of a windowless transmission line. By eliminating the need for a window, traditional limitations placed on the maximum power delivered to the resonating cavity are eliminated. Thus, the only practical limitation on the RF energy which can be delivered to a resonating cavity are the ability of RF energy source to produce that energy and the ability of the resonating cavity to manage that energy.

20 Claims, 3 Drawing Sheets

SYSTEM FOR SEPARATING CONSTITUENTS FROM A BASE MATERIAL

TECHNICAL FIELD

This invention relates generally to systems for separating material and more particularly relates to systems which use electromagnetic radiation to separate constituents from a base material.

BACKGROUND OF THE INVENTION

Innovative technologies are needed to effectively (and efficiently) separate specific components from a variety of composite materials. For example, there is a need for toxic and/or inherently dangerous materials to be converted into commercially useful products. Also, there exists a large number of sites which are contaminated with toxic and/or radioactive waste materials. Although certain processes are known for cleaning up contaminated sites, many of them employ solvents or other chemicals which often increase the disposal problem in an attempt to reduce it.

More recently, the use of radio frequency has been employed for heating liquid wastes for both volume reduction and stabilization in solid form. This process involves the slow application of moderate levels of radio frequency (RF) power which permits melting and stimulates out gassing from liquids and solids. Another application of the use of energy for separating constituents from a base material is currently being pursued with respect to refining mineral ores.

Although the broad concept of using RF energy for separating constituents from a base material is known (e.g. mineral refinement, see U.S. Pat. Nos. 4,894,134 and 5,024,740), many problems exist which impede the cost effectiveness and general ability of RF techniques to be used in a way which makes the RF approach commercially feasible.

For example, fundamental limitations in the application of gyrotron technology has presented an impediment to implementing the power levels necessary to make the RF approach commercially feasible. The fundamental limitations in the RF approach which heretofore have impeded its application on a widespread commercial bases will now be explained.

In order for the RF approach to be commercially feasible, the process of separating constituents from a base material must be cost effective. Very often, a major determination of whether a process is cost effective involves flow rate at which the base material can be processed. It is a fundamental principal of radio frequency heating that the power absorbed by a base material is directly proportional to the volume of the material. By increasing the volume flow per unit time through a separating apparatus, the power applied must also be increased to effect the same constituent separation. Thus, the ability to deliver power to a base material has become the central focus, and critical limiting factor, regarding the rate at which constituents could be separated from base material.

In the vast majority of applications, for which constituents must be separated from a base material, a gyrotron or a gyro-frequency device is the only practical source for generating the necessary power levels. Beyond 30 GHz, the power available from classical tubes declines sharply. The gyrotron offers the possibility of high power at millimeter wave frequencies. Because of the smooth shape of the gyrotron circular wave guide, and other features of the gyrotron, it is more efficient than other microwave tubes. The power available with a gyrotron is many times greater than that available from classical tubes at the same frequency. Additionally, recent advancements in microwave tube technology have made it possible to generate power levels in the range of 200K Watt continuous wave (CW). Moreover, at least one gyrotron manufacturer is currently experimenting with a gyrotron capable of generating power in the range of one megawatt CW at 110 GHz.

Although the generation of radio frequency power at the levels mentioned above, has potentially solved one of the primary impediments to making RF techniques for separating constituents commercially feasible, it has given rise to other problems. These will be explained in conjunction with FIG. 1.

Now referring to FIG. 1, the traditional approach when using RF energy for separating constituent materials from a base material is shown in FIG. 1. Traditionally, an RF source 10 is used (e.g. gyrotron klystron, magnetron, etc.) for generating RF energy. This energy is conveyed through transmission line 12, window 14, transmission line 16 and into reaction chamber 18. Within reaction chamber 18 the base material 20 is metered through feed apparatus 22 and is acted upon by the RF energy within reaction chamber 18. This reaction typically involves sublimation whereby gas escapes from base material 20 and is removed from reaction chamber 18 by way of off gas pump 24.

Transmission line 12 and 16 form a conventional wave guide which functions to couple the transfer of energy from RF source 10 to reaction chamber 18. In many wave guide applications, a window is not necessary. However, in applications such as the one depicted in FIG. 1, it is critical to isolate the environment of RF energy source 10 from the environment of reaction chamber. The primary purpose for this isolation is to prevent any gases or particles released during the sublimation process to migrate into RF energy source 10. If gases or particles were permitted to enter the RF energy source, electrical arcing would occur damaging or potentially destroying the gyrotron. The traditional approach for preventing the migration of undesirable gases and particles into RF energy source 10 has been to use a window 14. Ideally, the window should be transparent (i.e. lossless) to the propagation of the electromagnetic waves while hermetically sealing reaction chamber 18 from RF energy source 10. As RF energy sources have increased in their ability to generate higher and higher power levels, various window designs have been implemented in order to withstand the heat which is generated within the window by virtue of its exposure to the electromagnetic energy. For example, U.S. Pat. No. 5,450,047 sets forth an improved wave guide window for use in high power wave guide applications. Also, an article entitled *A VACUUM WINDOW FOR A ONE MW CW 110 GHz GYROTRON*, C. P. Moeller, J. P. Doane and M. DiMartino, General Atomics Report GA-821741 discloses a vacuum window which uses a water cooled sapphire as the dielectric.

Notwithstanding the advancements made in improving the ability of the window to be used in conjunction with higher and higher RF energy sources, the technology in generating RF energy has advanced to the point where the windows are the factor which limits the maximum power which can be developed in reaction chamber 18.

The present invention eliminates the limitations associated with the state of the art window technology (and its inability to transmit high power levels) by eliminating the requirement for a window while still hermetically sealing the RF energy source from the reaction chamber. Thus, by implementing the system of the present invention, the only factor which will limit the maximum amount of energy deliverable to a base material is the ability of the RF energy source to develop the energy and the ability of the reaction chamber to receive and focus the energy.

SUMMARY OF THE INVENTION

In one aspect, the present invention provides an apparatus for separating constituents from a base material comprising a source for generating electromagnetic radiation, a resonator, and a reactor. The resonator forms a resonating cavity wherein the resonating cavity is coupled to the electromagnetic radiation source. The reactor defines a reaction chamber which is at least partially disposed within the resonating cavity. The reactor is sealed to the resonator in a way that the reaction chamber is hermetically sealed from the resonating cavity. By disposing the reactor within the resonator in this way, the power density experience per unit volume of the reactor wall is much less (orders of magnitude) than that which would be experienced by a traditional window arrangement. Thus, the apparatus of the present invention completely eliminates the maximum power level limitations imposed by traditional windows.

In a second aspect, the present invention provides a system for separating constituents from a base material including a first and second source for respectively generating first and second electromagnetic waves. First and second resonators are provided for respectively forming first and second resonating cavities and the first and second resonating cavities are respectively coupled to the first and second magnetic wave sources. A reactor which defines a reaction chamber is partially disposed within the first and second resonating cavities wherein the first and second resonators are sealed to the reactor such that a first and second resonating cavities are hermetically sealed from the reaction chamber.

DETAILED DESCRIPTION OF THE PREFERRED EMBODIMENTS

Figure 1:
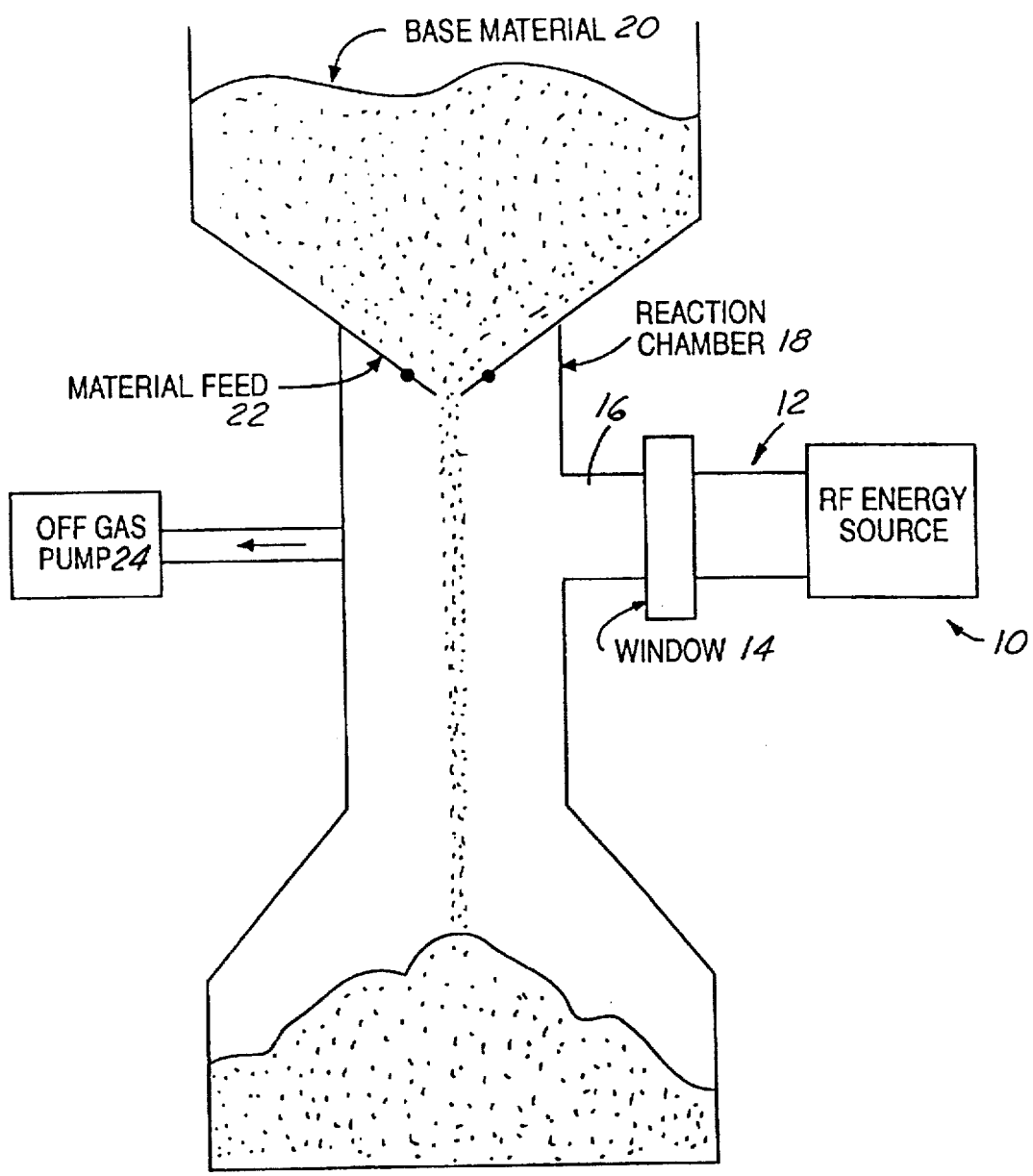
FIG. 1 discloses a typical prior art system for separating constituents from a base material.
Figure 2:
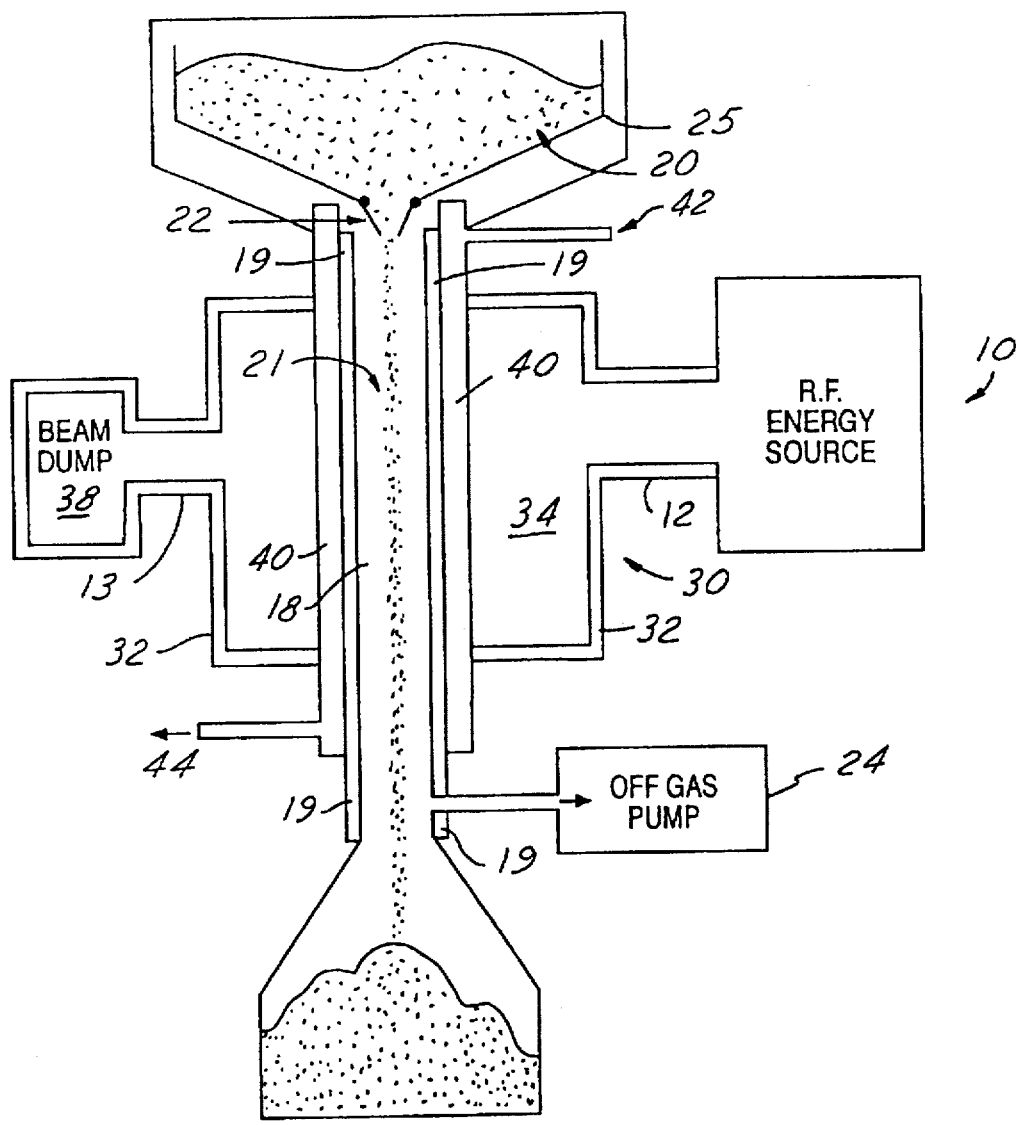
FIG. 2 shows the first embodiment of the system of the present invention.

Now referring to FIG. 2, the system of the present invention includes RF energy source 10 which is coupled to resonator 30 by way of transmission line 12. Consistent with techniques well known in the art, RF energy source 10 is used to generate RF energy and that energy is coupled into resonator 30 by way of transmission line 12. Preferably, resonator 30 is comprised of copper, stainless steel, or any other material which is highly reflective of RF energy. Base material 20 is stored within upper bin 25 and is metered from upper bin 25 (through material feed gate 22) into reactor 21. Reactor 21 is defined by reactor walls 19 which form reaction chamber 18. Reactor walls 19 can be constructed from any suitable pyrolytic material such as boron nitride, quartz, sapphire or diamond material.

Figures 3, 4:
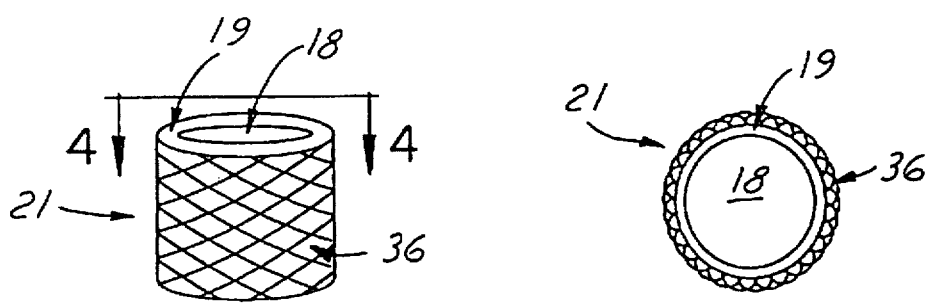
FIG. 3 shows the preferred embodiment for the reaction chamber of the present invention.
FIG. 4 shows a top view of the reaction chamber of FIG. 3.

In some applications, the power levels present within resonating cavity 34 may be sufficiently high to necessitate reinforcement of reactor walls 19. If such support is needed, one preferred way of adding this support is shown in FIGS. 3 and 4. In this preferred embodiment, reaction chamber 18 includes reactor walls 19 which are surrounded by a physical support structure such as metal mesh 36. The particular material used to construct mesh 36 is not critical as long as it provides sufficient strength to counteract the forces experienced by reaction walls 19 during the presence of RF power within resonator 30. Also, it is readily understood by those skilled in the art that the interstices formed by mesh 36 must be of sufficient spacing so as to permit RF energy to pass by the mesh (and enter into reaction chamber 18) while still giving ample support to walls 19.

Resonator 30 is defined by resonator walls 32 which form resonating cavity 34. RF energy enters into resonating cavity 34 by way of transmission line 12, and exits therefrom by transmission line 13, and is terminated into beam dump 38. RF energy residing within resonating cavity 34 freely passes through reactor walls 19 to act on base material 20 as base material passes through resonating cavity 34. As has already been explained, the RF energy acts to sublimate, vaporize, or otherwise separate constituents from the base material. If this separation gives rise to creation of gases, these gases are drawn from reaction chamber 18 by way of off gas pump 24. Off gas pump 24 also acts to create a pressure vacuum (less than atmospheric pressure) within reaction chamber 18.

It is important to note that reactor walls 19 are uninterrupted (continuous) at all locations within resonating cavity 34 and thus form a hermetic seal with respect to transmission line 12 and source 10. Thus, there is no passageway provided whereby base material 20 (or any constituents freed from base material) can escape from reaction chamber 18 to enter into the portion of resonating cavity 34 not confined by reaction chamber 18. Thus, with the system set forth in FIG. 2, the portion of resonating cavity 34 surrounding reaction chamber 18, transmission line 12, and RF energy source 10 are kept free from any base material or constituents freed therefrom.

It is readily seen from FIG. 2 that the surface area of reactor walls 19 confined within resonating cavity 34 is much greater than the surface area of a hypothetical window which would otherwise be used in this process. It is by this difference in surface area that the present invention allows the use of much higher power levels from RF energy source 10 than would otherwise be possible.

Preferably, off gas pump 24 generates a vacuum in the range of $10^{-10}$ torr.

In its preferred embodiment, reactor walls 19 are surrounded by heat exchanger 40 having inlet port 42 and outlet port 44. Heat exchanger 40 defines a fluid tight chamber surrounding a predetermined segment of walls 19 wherein a dielectric fluid, such as FLUORINERT (manufactured by Minnesota, Mining & Manufacturing Co.), which is a family of completely fluorinated organic compounds derived from common organic compounds by replacement of all carbon-bound hydrogen atoms with fluorine atoms, is passed therethrough conducting heat away from reactor walls 19.

Figure 5:
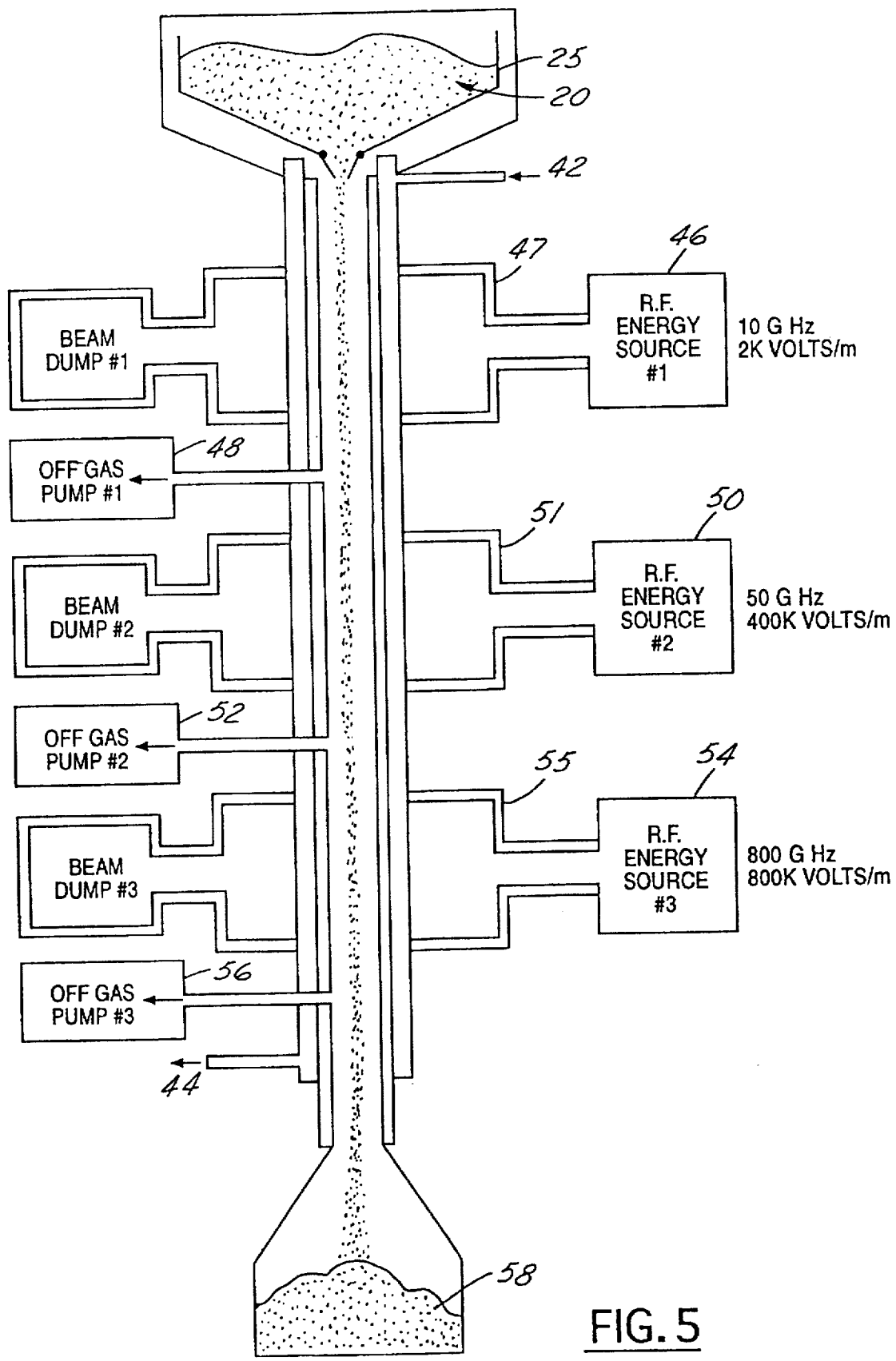
FIG. 5 shows a second embodiment of the system of the present invention.

Now referring to FIG. 5, in a second embodiment of the present invention, three systems, each one identical to that shown in FIG. 2, are stacked one on top of the other, to form a serial processing system. The advantage of the system shown in FIG. 5, is that it is capable of targeting a plurality of constituents to be separated from a base material. For example, a base material 20 is stored in upper bin 25 having certain known impurities. These impurities are known to be released from the base material when subjected to RF energy at a given frequency and a predetermined power level. RF energy source 46 is set at a first predetermined frequency and power level which is known to sublimate the first impurity which will be drawn off by pump 48. The second impurity is known to sublimate at a second predetermined frequency and power level and RF energy source 50 is so adjusted such that the second impurity is sublimated and drawn off by pump 52 as base material passes through resonator 51. Likewise, the third RF energy source 54 is set to a third predetermined frequency and power level such that the third targeted impurity is drawn by pump 56 as it sublimates within resonating cavity 55. Thus the system set forth in FIG. 5 is effective for removing at least three impurities found within base material 20 and also is effective for rendering purified product 58.

It is well known to those skilled in the art that the resonating cavities 47, 51, 55 must be electrically isolated from one another to prevent crossover of the electromagnetic energy between the cavities. Techniques for preventing this crossover are well known.

While the foregoing description of the invention has been made with respect to preferred embodiments, persons skilled in the art will understand in light of the present disclosure, that numerous changes, modifications and alterations may be made therein without departing from the spirit and the scope of the present invention. For example, out of convenience, when describing the present invention herein, the gas sublimated or vaporized from the base material has been referred to as the impurity. This convention has simply been adopted out of convenience and it is well recognized that the gas released from the base material may in fact be a valuable byproduct. Also, although no specifically disclosed, herein, it is also recognized that introducing gases into reaction chamber 18 may provide certain advantages such as accelerating sublimation/vaporization, cooling reaction chamber 18, etc. Therefore, all such changes, modifications, and alterations are deemed to be within the scope of the invention as defined in the following claims.

We claim:

1. An apparatus for separating constituents from a base material, comprising:

a source for generating electromagnetic radiation;

a resonator forming a resonating cavity, a wave guide for coupling said electromagnetic radiation from said generating source to said resonating cavity;

a reactor defining a reaction chamber, said reactor at least partially disposed within said resonating cavity, wherein said reaction chamber is hermetically sealed from said resonating cavity and wherein said source includes a gyrotron.

2. The apparatus of claim 1, wherein said resonator is fabricated from materials selected from the group consisting of copper or stainless steel.

3. The apparatus of claim 1, wherein said reactor is formed from boron nitride.

4. The apparatus of claim 3, wherein said boron nitride is fashioned in the shape of a circular cylinder.

5. The apparatus of claim 1, further including a heat exchanger thermally coupled to said reactor.

6. The apparatus of claim 5, wherein said heat exchanger includes an inner chamber for channeling the flow of a dielectric fluid disposed therein.

7. The apparatus of claim 1, further including an off gas pump connected to said reaction chamber.

8. An apparatus for separating constituents from a base material, comprising:

a first source for generating a first electromagnetic wave having a first frequency;

a second source for generating a second electromagnetic wave having a second frequency;

a first resonator forming a first resonating cavity, wherein said first resonating cavity is coupled to said first electromagnetic wave source for receiving into said first resonating cavity said first electromagnetic wave;

a second resonator forming a second resonating cavity, wherein said second resonating cavity is coupled to said second electromagnetic wave source for receiving into said second resonating cavity said second electromagnetic wave;

a reactor defining a reaction chamber, said reactor at least partially disposed within said first and second resonating cavities, wherein said first and second resonating cavities are hermetically sealed from said reaction chamber.

9. The apparatus of claim 8, wherein at least one of said first and second sources includes a gyrotron.

10. The apparatus of claim 8, wherein at least one of said first and second resonators is fabricated from materials selected from the group of copper or stainless steel.

11. The apparatus of claim 8, wherein said reactor is formed from boron nitride.

12. The apparatus of claim 11, wherein said boron nitride is fashioned in the shape of a circular cylinder.

13. The apparatus of claim 8, further including a heat exchanger thermally coupled to said reactor.

14. The apparatus of claim 13, wherein said heat exchanger includes an inner chamber for channeling the flow of a dielectric fluid disposed therein.

15. The apparatus of claim 8, further including an off gas pump connected to said reaction chamber.

16. An apparatus for separating constituents from a base material using electromagnetic radiation, comprising:

a resonator forming a resonating cavity, a electromagnetic radiation source;

a wave guide coupling said resonating cavity to said electromagnetic radiation source a reactor defining a reaction chamber, said reactor at least partially disposed within said resonating cavity, wherein said reaction chamber is hermetically sealed from said resonating cavity and wherein said reactor is formed from boron nitride.

17. The apparatus of claim 16, wherein said boron nitride is fashioned in the shape of a circular cylinder.

18. The apparatus of claim 16, further including a heat exchanger thermally coupled to said reactor.

19. The apparatus of claim 18, wherein said heat exchanger includes an inner chamber for channeling the flow of a dielectric fluid disposed therein.

20. The apparatus of claim 16, further including an off gas pump connected to said reaction chamber.

* * * * *